United States Patent [19] [11] Patent Number: 4,822,417
Kobayashi et al. [45] Date of Patent: Apr. 18, 1989

[54] MARKING INK COMPOSITION

[75] Inventors: Yuichi Kobayashi, Mito; Satoshi Saito, Inashiki, both of Japan

[73] Assignee: Pentel Kabushiki Kaisha, Tokyo, Japan

[21] Appl. No.: 22,625

[22] Filed: Mar. 5, 1987

[51] Int. Cl.$^4$ ............... C09D 11/16; C09D 11/06
[52] U.S. Cl. .................. 106/23; 106/26; 106/27; 106/29; 106/30; 260/DIG. 38
[58] Field of Search ............... 106/26, 27, 29, 30, 106/248, 228, 23; 260/DIG. 38; 523/160; 524/284

[56] References Cited

U.S. PATENT DOCUMENTS 4,102,848  7/1978  Koch ........................ 260/31.6

FOREIGN PATENT DOCUMENTS 108270  6/1983  Japan .

Primary Examiner—Amelia Burgess Yarbrough
Assistant Examiner—Christine A. Skone
Attorney, Agent, or Firm—Wenderoth, Lind & Ponack

[57] ABSTRACT

A marking ink composition comprising a colorant, an organic solvent, a resin soluble in said organic solvent and a decaglycerol fatty acid ester represented by the general formula (1):

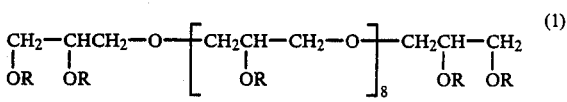

wherein R is an acyl group or a hydrogen atom.

The marking ink composition of the present invention exhibits an excellent resistance to drying of a nib of a pen so that the nib undergoes no significant drying even when the pen is left to stand with its cap removed.

3 Claims, No Drawings

MARKING INK COMPOSITION

BACKGROUND OF THE INVENTION

This invention relates to a marking ink composition which exhibits an excellent resistance to drying of a nib of a pen so that the nib undergoes no significant drying even when the pen is left to stand with its cap removed.

Marking ink compositions, i.e., oil-based inks have widely been used, since they not only can be used for writing on the surface of absorbent materials such as paper or cloth as well as non-absorbent materials such as plastic, glass or metal, but also are quick-drying. These inks include various types ranging from ordinary ones capable of providing firmly fixed writings to erasable inks for writing boards which, due to the incorporation of a release agent, can provide writings on non-absorbent surfaces capable of being erased by softly rubbing with a dry cloth, etc.

However, each of the above-mentioned marking ink compositions has several problems. That is, when the ink of this type is used in writing instruments and left to stand with its cap removed, the evaporation of an organic solvent in the ink composition occurs so that a colorant, a resin and the like in the composition are deposited. Such deposition causes logging of the inside as well as the surface of the nib of the pen. As a result, the ink is not sufficiently discharged from the nib to thereby give a scratchy line in writing and further to be impossible to write.

In order to solve such problems, various proposals have been made. For example, the addition of a higher fatty acid ester of a polyglycerol to a marking ink has been proposed (see Japanese Patent Laid-Open Specification No. 58-108270), and the effect of suppressing the evaporation of a solvent from a nib by virtue of such an addition is disclosed therein. However, polyglycerols of the polyglycerol fatty acid ester used in the above-mentioned prior art are limited to those of dimer to hexamer of glycerol. Moreover, the effect of suppressing the evaporation obtained by the addition is not necessarily satisfactory from the practical point of view.

SUMMARY OF THE INVENTION

In view of the above, an object of the present invention is to provide a marking ink composition having an improved effect of suppressing the evaporation of an organic solvent from a nib and exhibiting an excellent resistance to drying of the nib.

According to the present invention, there is provided a marking ink composition comprising at least a colorant, an organic solvent, a resin soluble in the organic solvent and a decaglycerol fatty acid ester represented by the general formula(1):

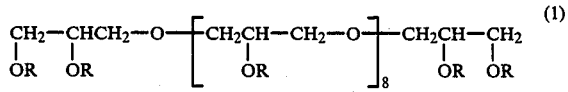

wherein R is an acyl group or a hydrogen atom.

DETAILED DESCRIPTION OF THE INVENTION

Although the reason why the marking ink composition of the present invention exhibits an excellent resistance to drying of a nib is not yet elucidated, it is believed to be as follows.

The decaglycerol fatty acid ester used in the present invention and represented by the above general formula (1) is deposited at the same time when the organic sovlent evaporates at the nib to cause deposition of the colorant and the resin, which prevents a firm bonding between the colorant themselves and between the resin themselves and leads to prevention of formation of a rigid film. Therefore, a remarkably weak film is formed on the surface of the nib, which prevents further evaporation of the organic solvent and is easily broken by application of an ordinary writing pressure to make it possible to effect ordinary writing.

It is believed that, since the fatty acid ester of decaglycerol (decamer) used in the present invention is higher in molecular weight than the fatty acid ester of a polyglycerol in the form of dimer to hexamer used in the above-mentioned prior art, it swells in the solvent to exhibit a colloidal state, causing the evaporation-preventing film formed on the surface of the nib to be easily broken by application of a writing pressure.

The respective components of the composition of the present invention will now be described in more detail hereinbelow.

The colorants include oil-soluble dyes soluble in organic solvents and alcohol-soluble dyes and pigments. With respect to the pigments, any pigments may be used as far as they are stably dispersible in the form of fine particles in an ink composition, but modified pigments having surfaces coated with a resin are particularly preferable from the standpoint of dispersibility, stability with time and workability. Although the amounts of these colorants used vary depending on the kinds of the colorants and the other components of the ink composition, they are used in an amount of 1 to 20% by weight, preferably 2 to 17 % by weight based on the total amount of the ink.

Examples of the organic solvent include lower alcohols such as ethanol, propanol, isopropanol, butanol and the like, lower aliphatic ketones such as methyl ethyl ketone, methyl isobutyl ketone and the like, lower alcohol esters of lower fatty acids such as ethyl acetate, butyl acetate and the like, aromatic hydrocarbons such as benzene, toluene xylene and the like, alicyclic alcohols and glycol alkyl ethers. These are used alone or in any mixture thereof, and their amount is 55 to 90% by weight, preferably 65 to 85% by weight based on the total amount of the ink.

The resin is used for imparting film-forming properties, for imparting adherence to the surface to which the ink is applied and for adjusting the viscosity of the ink. Conventionally used natural and synthetic resins are suitable as the resin, and specific examples thereof include rosin resins such as rosin, rosin ester, rosin-modified glycerol ester, rosin-modified maleic acid resin, rosin-modified phenol resin, rosin-modified phenol glycerol ester, and the like, cellulose resins such as ethylcellulose, acetylcellulose and the like, petroleum resins, ketone resins, polyvinyl butyral, vinyl chloridevinyl acetate copolymer and vinylidene chloride-vinyl chloride copolymer. The resin is used in an amount of 1 to 30% by weight, preferably 3 to 19% by weight based on the total amount of the ink.

The decaglycerol fatty acid ester represented by the general formula (1) is used for improving the resistance to drying of a nib. Specific examples thereof include decaglycerol heptaoleate, decaglyceryl decaoleate, decaglyceryl pentastearate, decaglyceryl heptastearate, decaglyceryl decastearate and the like, among which decaglyceryl pentastearate and decaglyceryl heptastearate are preferred. These are used in an amount of 0.05 to 5% by weight, preferably 0.15 to 3% by weight based on the total amount of the ink.

The erasable ink for writing boards capable of providing writings on the non-absorbent surface which are easily erased by softly rubbing with a dry cloth, etc. can be prepared by adding a release agent in addition to the above-mentioned components. Such a release agent should be soluble in the above-mentioned organic solvent, lower in vapor pressure than that of the organic solvent and hardly volatile or nonvolatile. Examples of the release agent include higher fatty acid esters, higher aliphatic hydrocarbons, polyoxyethylene alkyl ether nonionic surfactants and their derivatives, polyoxyethylene alkylphenol ether nonionic surfactants and their derivatives, and the like. The use of these release agents alone or in any mixture thereof serves to impart an erasability to the writings. Specific examples of preferable higher fatty acid ester are esters of higher fatty acids having 6 or more carbon atoms with aliphatic alcohols having 2 or more carbon atoms, and include n-butyl stearate, hexadecyl 2-ethylhexanoate, stearyl 2-ethylhexanoate, isopropyl myristate, octyl palmitate, isooctyl stearate, isobutyl stearate, isobutyl oleate and the like. These are used in an amount of 1 to 10% by weight, preferably 2 to 8% by weight based on the total amount of the ink.

Preferred higher aliphatic hydrocarbons are paraffinic and olefinic hydrocarbons which are liquid at ordinary temperature, and include liquid paraffin, Dialen 124, Dialen 168, Dialen 208 and Dialen 30 (all of the Dialens being manufactured by Mitsubishi Chemical Industries, Ltd.). These are used in an amount of 1 to 10% by weight, preferably 5 to 9% by weight based on the total amount of the ink.

The polyoxyethylene alkyl ether nonionic surfactant and its derivative, and polyoxyethylene alkylphenol ether nonionic surfactant and its derivative include polyoxyethylene lauryl ether, polyoxyethylene cetyl ether, polyoxyethylene oleyl ether, polyoxyethylene stearyl ether, polyoxyethylene nonylphenyl ether and the like, and specific examples thereof include Emulgen 105 (manufactured by Kao Atlas, co., Ltd.), Nikkol BC-2 and Nikkol BO-2 (both being manufactured by Nikko Chemicals Ltd.), Emulgen 404 and Emulgen 408 (both being manufactured by Kao Atlas Co., Ltd.), Nikkol BS-2 (manufactured by Nikko Chemicals Ltd.) and Noygen EA-50 and Noygen EA-70 (both being manufactured by Dai-Ichi Kogyo Seiyaku Co.,Ltd.). These are used in an amount of 1 to 10% by weight, preferably 3 to 8% by weight based on the total amount of the ink.

The marking ink composition of the present invention may optionally contain various additives such as antiseptic agents, mildewproofing agents, wetting agents, viscosity modifiers, antifreezing agents, antifoaming agents, surfactants, etc., in addition to the above-mentioned components.

The marking ink composition of the present invention can easily be obtained by mixing and dispersing the above-mentioned components in a dispersion mixer such as a homomixer, a ball mill or a laboratory mixer.

EXAMPLES

The present invention will now be described in more detail with reference to the following examples. In the examples, the description "parts" means "parts by weight".

Marking ink compositions were obtained by mixing and dispersing the components of Examples 1 to 4 and Comparative Examples 1 to 5 as indicated in Table 1 given below by means of a homomixer.

It is noted that Examples 1 and 2 and Comparative Examples 1 and 2 are ordinary oil-based inks while Examples 3 and 4 and Comparative Examples 3, 4 and 5 are erasable inks for writing boards.

TABLE 1

| | Component | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 (unit: part) |
|---|---|---|---|---|---|---|---|---|---|---|
| colorant | Valifast Red #1808 (1) | 7 | | | | 7 | | | | |
| | Neozapon Black RE (2) | | 16 | | | | 16 | | | |
| | Fuji As Black (3) | | | 8 | | | | 8 | 8 | |
| | Fuji IK Blue (4) | | | | 7 | | | | | 7 |
| resin | Tamanol 100S (5) | 4 | | | | 4 | | | | |
| | gum rosin (6) | 1 | 10 | | | 1 | 10 | | | |
| organic solvent | ethanol | 64 | | 45 | | 64 | | 45 | | 45 |
| | n-propanol | | 12 | | | | 13 | | | |
| | isopropanol | | | 35.9 | | | | 36.4 | | 35.9 |
| | ethylcellosolve | 20 | | | | 21 | | | | |
| | methylcellosolve | | 55 | | | | 55 | | | |
| | ethyl acetate | 3 | | | | 3 | | | | |
| | butyl acetate | | | | 31.5 | | | | 32 | |
| organic solvent | methyl ethyl ketone | | | 43 | | | | | 43 | |
| | methyl isobutyl ketone | | | | 7 | | | | 7 | |
| | xylol | | 6 | | | | 6 | | | |
| additive | Decaglyn 5-S (7) | 1 | | 0.5 | | | | | | |
| | Decaglyn 7-S (8) | | 1 | | 0.5 | | | | | |
| | DGMS (9) | | | | | | | | | 0.5 |
| release agent | hexadecyl 2-ethylhexanoate | | | 6.8 | | | | 6.8 | | 6.8 |
| | Emulgen 408 (10) | | | 3.8 | | | | 3.8 | | 3.8 |
| | n-butyl stearate | | | | 8 | | | | 8 | |
| | liquid paraffin | | | | 3 | | | | 3 | |

[Supplementary Explanation to Table 1]

(1) Valifast Red #1808: a mixture of C.I. Acid Red 23, manufactured by Orient Chemical Industries, Ltd.
(2) Neozapon Black RE: C.I. Solvent Black 27, manufactured by BASF AG.

(3) Fuji AS Black: a processed pigment [pigment: carbon black 45 wt %), resin: polyvinyl butyral (55 wt %)] manufactured by Fuji Pigment Co., Ltd.

(4) Fuji IK Blue: a processed pigment [pigment: phthalocyanine blue (50 wt %), resin: vinyl chloride-vinyl acetate copolymer (50 wt %)] manufactured by Fuji Pigment Co., Ltd.

(5) Tamanol 100S: an oil-soluble phenolic resin, manufactured by Arakawa Chemical Industries, Ltd.

(6) Gum rosin: a rosin-modified glycerol ester, manufactured in the People's Republic of China (7) Decaglyn 5-S: decaglycerol pentastearate, manufactured by Nikko Chemicals Ltd.

(8) Decaglyn 7-S: decaglycerol heptastearate, manufactured by Nikko Chemicals Ltd.

(9) DGMS: diglycerol monostearate, manufactured by Nikko Chemicals Ltd.

(10) Emulgen 408: polyoxyethylene oleyl ether, manufactured by Kao Soap Co., Ltd.

Tests on resistance to drying of a nib were conducted on marking ink compositions obtained in Examples 1 to 4 and Comparative Examples 1 to 5.

The results are shown in Table 2.

TABLE 2

| [Tests on resistance to drying of a nib] | | | |
|---|---|---|---|
| Results of test | | Results of test | |
| Ex. 1 | 7 hr | Comp. Ex. 1 | 60 min |
| Ex. 2 | 3 hr | Comp. Ex. 2 | 20 min |
| Ex. 3 | 8 hr | Comp. Ex. 3 | 15 min |
| Ex. 4 | 8 hr | Comp. Ex. 4 | 15 min |
| | | Comp. Ex. 5 | 90 min |

(Note)
Test Method: Writing instruments comprising a fibrous core nib and a packing cotton were filled with each marking ink composition. The writing instruments were left to stand with their caps removed in a room (at a temperature of 20° C. and a relative humidity of 50%). Time required for giving a scratchy line in writing was determined by conducting writing every 5 minutes until 1 hour passed after initiation of leaving to stand and then every 1 hour thereafter.

As is apparent from the foregoing, the marking ink composition of the present invention exhibits an excellent resistance to drying of a nib when used in writing instruments. Particularly, it is noted that, among similar polyglycerol fatty acid esters, an ester of decaglycerol used in the present invention is superior in resistance to drying of a nib to that of an ester of diglycerol used in Comparative Example 5.

While the invention has been described with respect to a preferred embodiment, it should be apparent to those skilled in the art that numerous variations and modifications may be made thereto without departing from the spirit and scope of the invention.

What is claimed is:

1. A marking ink composition comprising, based on the total weight of the ink composition:

(1) 1 to 20% by weight of a pigment, an organic solvent-soluble dye, or a mixture thereof;

(2) 55 to 90% by weight of an organic solvent;

(3) 1 to 30% by weight of a resin soluble in said organic solvent and being selected from the group consisting of polyvinyl butyral, vinyl chloride-vinyl acetate copolymer, rosin resins and cellulose resins; and (4) 0.05 to 5% by weight of a decaglycerol stearate ester represented by the formula

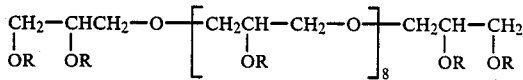

wherein R is a stearoyl group or a hydrogen atom.

2. The marking ink composition according to claim 1, wherein said decaglycerol stearate ester is decaglycerol pentastearate or decaglycerol heptastearate.

3. The marking ink composition according to claim 1, which further contains a release agent selected from the group consisting of an ester of a higher fatty acid with aliphatic a monohydric alcohol, a higher aliphatic hydrocarbon, a polyoxyethylene alkyl ether nonionic surfactant or its derivative, and a polyoxyethylene alkylphenol ether nonionic surfactant or its derivative.

* * * * *